Nov. 29, 1932.     A. C. SCHNAKE     1,889,501
SOAP HOLDER
Filed Sept. 19, 1931
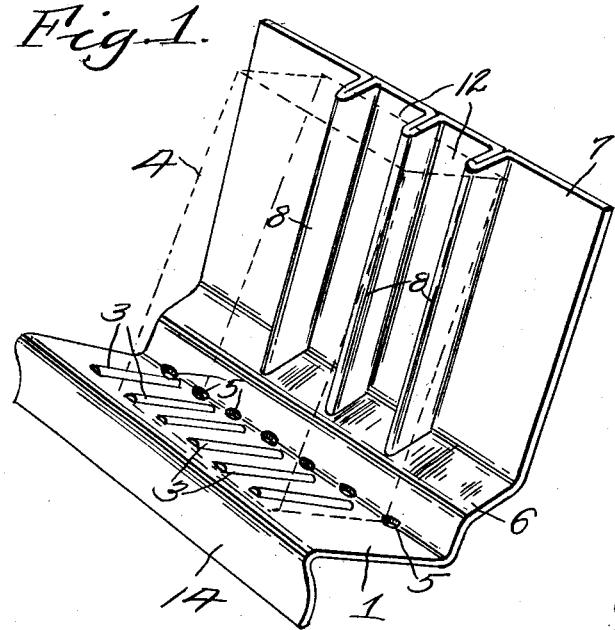
Fig. 1.
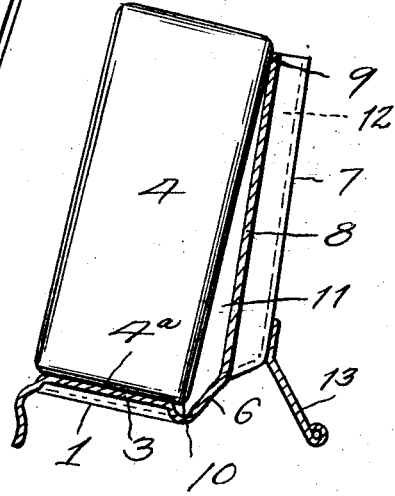
Fig. 2.
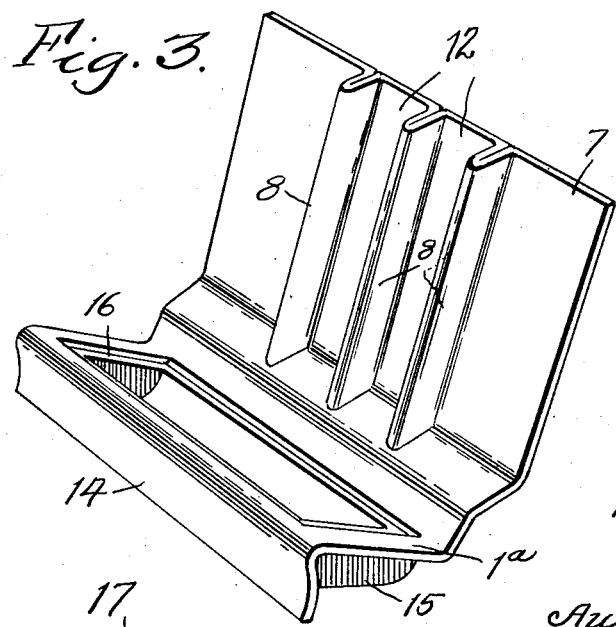
Fig. 3.
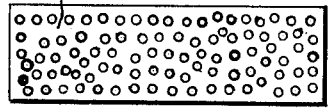
Fig. 5.
Fig. 4.
Inventor
August C. Schnake
By Philip A. Ferrell
Attorney Patented Nov. 29, 1932

1,889,501

UNITED STATES PATENT OFFICE

AUGUST C. SCHNAKE, OF CENTRALIA, ILLINOIS

SOAP HOLDER

Application filed September 19, 1931. Serial No. 563,862.

The invention relates to soap holders, and has for its object to provide a device of this character wherein a cake of soap is supported in a position closely approaching a vertical one so that all of the moisture will easily and quickly drain therefrom before it is absorbed into the body of the cake and softens the same.

A further object is to provide means whereby air may circulate around all sides of the cake of soap for quick drying purposes.

A further object is to provide the rear side of the holder with spaced channels, in which the fingers may be placed for gripping the cake when it is desired to remove the same from the holder, said channels also forming ventilating means.

A further object is to provide the bottom of the holder with drainage aperatures disposed in a position where water which drains from the lowest corner of the cake of soap will pass through said apertures.

A further object is to provide the inclined bottom of the holder with ribs which support the bottom of the cake of soap spaced from the bottom of the holder so that mositure will easily and quickly drain therefrom.

A further object is to dispose the flanges forming the finger engaging channels in relation to the bottom of the holder and the adjacent wall of the cake of soap whereby air can circulate transversely and vertically behind the cake of soap.

A further object is to form the holder from a single sheet of material stamped to form.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:

Figure 1 is a perspective view of the holder.

Figure 2 is a vertical longitudinal sectional view through the holder.

Figure 3 is a perspective view of a modified form of holder having a liquid receiving chamber therein.

Figure 4 is a vertical longitudinal sectional view through the holder shown in Figure 3.

Figure 5 is a plan view of the apertured drainage plate for use in the forms shown in Figures 3 and 4.

The device hereinafter set forth is described as a portable one, however it is to be understood the same may be built in as a fixture in connection with a bath-room wall or in connection with wash basins and the like.

Referring to the drawing, the numeral 1 designates the rearwardly inclined bottom of the holder which is preferably provided with upwardly struck ribs 3, on which the cake of soap 4 rests as clearly shown in Figure 2, and by providing said inclined bottom and ribs, it is obvious that liquid from the cake of soap, after use, will drain onto the bottom and will flow rearwardly between the ribs 3 to the drain apertures 5, from which it will drain into the wash basin in the usual manner. The rear end of the bottom 1 terminates in an upwardly and rearwardly extending angular portion 6, which in turn terminates in an upwardly and rearwardly inclined back 7. Struck in from the back 7 are ribs 8, against the upper ends of which the cake of soap 4 engages at 9 when the soap is in the holder. It will be noted that the cake of soap 4 is supported so that all of its sides are in planes other than a horizontal, and in a position whereby water on the cake will flow by gravity over said sides to the lower corner 10, from which it will drain onto the bottom 1 and through the drainage apertures 5. The cake of soap is supported in a position closely approaching a vertical one, so that the draining operation will be a rapid one thereby preventing the water from being absorbed by the cake of soap and softening the soap which causes considerable loss. It will be noted that when the cake of soap 4 has its lower side 4a in engagement with the ribs 4, there is an air space 11 between the rear side of the cake of soap and the ribs 8 through which air may circulate for drying purposes.

The back 7 is provided with a plurality of struck in ribs 8 as clearly shown in Figures 1 and 3, and which ribs form finger receiving channels 12, in which the fingers are placed for gripping the rear side of the cake of soap when removing the same from the holder, thereby allowing the cake of soap to be easily and quickly removed from the holder, or placed therein. Extending downwardly from the rear side of the holder is a supporting leg 13, and extending downwardly from the forward end of the inclined bottom 1 is a supporting flange 14, which in combination with the leg 13 supports the device, unless the device is formed as a fixed portion of the bathroom equipment.

Referring to Figures 3, 4 and 5, the structure is substantially the same with the exception that the bottom 1a is provided with a downwardly struck receptacle 15 having a downwardly struck shoulder 16 on which the apertured plate 17 rests for supporting the cake of soap. This form is particularly adapted for use where direct drainage to a wash basin is not possible or desirable.

From the above it will be seen that a soap holder is provided, which will support the soap in a position where it will quickly drain thereby preventing softening of the cake and consequent loss. It will also be seen that air may circulate around the cake at all times, and the device is constructed in a manner whereby it may be cheaply manufactured and sold.

The invention having been set forth what is claimed as new and useful is:—

1. A soap holder comprising a rearwardly inclined bottom, said bottom terminating in an upwardly and rearwardly inclined flange, said flange terminating in an upwardly and rearwardly inclined back, spaced ribs carried by said upwardly extending flange and back and extending forwardly, said ribs being positioned whereby they will engage the rear side of a cake of soap resting on the bottom at the upper end of the soap and ribs, thereby allowing a free circulation of air between the soap, ribs and back, said ribs being of sufficient depth and distance apart whereby the fingers of a person will be received therebetween for gripping the upper end of the cake of soap when removing the same from the holder.

2. A device as set forth in claim 1, including drainage means carried by the bottom where it merges into the upwardly extending flange.

3. A device as set forth in claim 1 wherein the upwardly extending flange is angular shaped and the ribs are carried by the upper portion of the angularly shaped flange and the back and stamped from a single sheet of material.

In testimony whereof he hereunto affixes his signature.

AUGUST C. SCHNAKE.